United States Patent

Bowers et al.

[11] Patent Number: 5,856,424
[45] Date of Patent: Jan. 5, 1999

[54] PROCESS FOR MAKING POLYESTERS CONTAINING LOW CONCENTRATIONS OF DIETHYLENE GLYCOL

[75] Inventors: David Taylor Bowers; Ronnie Jay Jones, by Nina C. Jones, executrix; Michael Duane Cliffton; Joseph Franklin Knight; Donna Rice Quillen, all of Kingsport, Tenn.

[73] Assignee: Eastman Chemical Company, Kingsport, Tenn.

[21] Appl. No.: 950,210

[22] Filed: Oct. 14, 1997

[51] Int. Cl.$^6$ ..................................................... C08G 63/02
[52] U.S. Cl. ............................................. 528/272; 528/271
[58] Field of Search ................................. 528/196, 271, 528/272

[56] References Cited

U.S. PATENT DOCUMENTS

4,654,249  3/1987  Barbey et al. .
4,960,915  10/1990  Thiele .

FOREIGN PATENT DOCUMENTS

EP 0 339 378 A2  11/1989  European Pat. Off. .
WO 92/01013 A1  1/1992  WIPO .
WO 95/03348 A1  2/1995  WIPO .

OTHER PUBLICATIONS

Chemical Abstracts, vol. 81, No. 18, Nov. 4, 1974, Columbus, OH, Abtract No. 106348, XP002054008 (see abstract) & JP 49 009 634 B (Teijin), Mar. 5, 1974.

Patent Abstracts of Japan, vol. 017, No. 689 (C–1143), Dec. 16, 1998 & JP 05 230201 A (Dainippon Ink & Chem Inc), Sep. 7, 1993 (see abstract).

Patent Abstracts of Japan, vol. 018, No. 163 (C–1181), Mar. 18, 1994, & JP 05 331299 A (Teijin Ltd), Dec. 14, 1993 (see abstract).

Patent Abstracts of Japan, vol. 095, No. 003, Apr. 28, 1995 & JP 06 345859 A (Teijin Ltd), Dec. 20, 1994 (see abstract).

Patent Abstracts of Japan, vol. 008, No. 024 (C–208), Feb. 2, 1984 & JP 58 191716 A (Toray KK), Nov. 9, 1983 (see abstract).

Patent Abstracts of Japan, vol. 010, No. 172 (C–354), Jun. 18, 1986 & JP 61 023623 A (Toray KK), Feb. 1, 1986 (abstract).

*Primary Examiner*—Terressa Mosley
*Attorney, Agent, or Firm*—Karen A. Harding; Harry J. Gwinnell

[57] ABSTRACT

The present invention relates to a process for producing a high molecular weight polyester having less than about 0.5 weight % diethylene glycol comprising adding at least one carbonate compound to the ester exchange reaction product produced from reaction of a glycol component comprising ethylene glycol and an ester component comprising dimethylterephthalate, dimethylnaphthalenedicarboxylate and mixtures thereof wherein said reaction product is formed without a Ti catalyst.

28 Claims, No Drawings

PROCESS FOR MAKING POLYESTERS CONTAINING LOW CONCENTRATIONS OF DIETHYLENE GLYCOL

This application is based upon and claims the priority of provisional application 60/028,647, filed Oct. 16, 1996.

FIELD OF THE INVENTION

This invention relates to a process for production of ethylene glycol (EG) based linear polyesters which have reduced concentrations of diethylene glycol (DEG) in the polymer backbone. In particular, this invention relates to a process to make low DEG containing polyesters from 2,6-dimethylnaphthalate (DMN), 2,6-Naphthalene dicarboxylic acid (N-acid), 1,4-dimethylterephthalate (DMT), and terephthalic acid (TPA). A second aspect of this invention is a process for making low DEG containing linear polyesters which contain clay additives, which are materials useful in production of films and foils.

THE PRIOR ART

Commercial linear polyester production, in general, involves a two-step process where in the first step, EG in molar excess, is reacted with either an aromatic dicarboxylic acid or a low molecular weight diester of an aromatic dicarboxylic acid to form a bis-hydroxyethylene terminated diester of the aromatic moiety, here after referred to as "oligomer". The by-product of the reaction, water or low molecular weight alcohol such as methanol, depending on the starting aromatic moiety, is removed by distillation. This reversible step is referred to as ester exchange or esterification. Ester exchange involving use of a low molecular weight diester of an aromatic dicarboxylic acid, such as DMT or DMN is generally catalyzed by metals in the 5 to 500 ppm range. Common ester exchange metal catalysts include lithium, titanium, magnesium, calcium, manganese, cobalt, and zinc. Ester exchange is normally undertaken at reaction temperatures ranging from 180°–230° C. at atmospheric pressure or under pressure. Following ester exchange, catalyst metals are usually sequestered by addition of a phosphorus compound which helps prevent the catalysis of degradation reactions which occur at higher temperatures found in the second step, polycondensation. Common phosphorus compounds added after ester exchange for this purpose include phosphoric acid, phosphorous acid, phosphonic acid, etc., and their derivatives. Monomer is then polymerized by addition of a polymerization catalyst, increasing the reaction temperature and application of vacuum. Polycondensation is done in the presence of catalyst in the ppm range, at temperatures from 260°–300° C., and vacuum of 1 torr or less, in order to produce high molecular weight polymer. Common polymerization catalyst include tin, antimony, titanium, and germanium. EG is the main by-product from this step along with minor components including water, and methanol, again depending on the choice of starting materials, and low molecular weight oligomeric material.

As mentioned above, degradation side reactions take place at higher temperatures during polymerization which are known to produce vinyl and carboxyl end groups. Low molecular weight by-products arising from degradation reactions include acetaldehyde, color bodies, and diethylene glycol (DEG) being difunctional, readily incorporates into the backbone of the polyester. As DEG concentration in the polyester increases, the polymer's melting point decreases and the polymer melt generally crystallizes at a much lower temperature. These characteristics are often times considered detrimental in many applications of polyesters such as PET and PEN. Thus it is beneficial for many applications where thermal properties are critical to keep DEG incorporation in the polymer backbone to a minimum.

One application where low DEG concentration in the polyester backbone has been determined to be critical is in films and foils where finely distributed particles are added to the polymerization after ester exchange. Clay type additives containing aluminum silicates in polyesters generally improve surface characteristics for these applications. For example, Kaolin with a particle diameter of no greater than 1 m is utilized in U.S. Pat. No. 4,654,249. As stated in the prior art portion of U.S. Pat. No. 4,960,915, natural aluminum silicates and clay like substances used in these applications contain metals which enhance the concentration of DEG during the polyester synthesis. U.S. Pat. No. 4,960,915 discloses decreasing the increased DEG by treating an EG/kaolin slurry with an acidic phosphorus compound to neutralize kaolin's natural metals, and then treating the phosphorus treated suspension with a strongly alkaline compound to adjust the pH to 6.1 to 9.0, as measured with a glass electrode. The suspension is added to polyester reaction sequence not later than the beginning of polycondensation, to produce polyester with DEG content of not more than 1.5% by weight.

SUMMARY OF THE INVENTION

The present invention relates to improved polyester synthesis processes which produce polyesters having lower DEG concentrations.

More particularly the invention relates to a process for producing a high molecular weight polyester having less than about 0.5 weight % diethylene glycol comprising adding at least one carbonate compound to the ester exchange reaction product produced from reaction of a glycol component comprising ethylene glycol and an ester component comprising dimethylterephthalate, dimethylnaphthalenedicarboxylate and mixtures thereof wherein said reaction product is formed without a Ti catalyst In one aspect of the invention a carbonate compound is added post ester exchange. The carbonate compound is formed from the reaction of an acidic phosphorus compound with an alkali metal carbonate in EG. The mixture produced from this reaction is slurried or dissolved in additional EG or water and added to monomer produced in the ester exchange portion of linear polyester synthesis just prior to addition of polyester catalysts and commencement of polycondensation. Using polycondensation conditions well known to one skilled in the art, high molecular weight linear polyester with less than about 0.5 weight percent DEG is obtained.

The alkali metal carbonate for this invention is selected from sodium carbonate, potassium carbonate, lithium carbonate, calcium carbonate, magnesium carbonate, or mixtures thereof. Preferably said alkali metal carbonate is sodium carbonate, potassium carbonate or mixtures thereof.

Acidic phosphorus compounds useful in this process include phosphoric acid, phosphorous acid, acidic salts and acidic esters, phosphonic acid derivatives and mixtures thereof. Phosphoric acid is preferred.

The reaction of the alkali metal carbonate and acidic phosphorus compound is generally conducted at temperatures below about 80° C. and preferably at temperatures between about room temperature (about 25° C.) and about 80° C. Some agitation for good mixing is preferred, but not necessary for this aspect of the invention. The concentration of alkali metal carbonate and acidic phosphorus compound in EG is not critical for the reaction. However, the preferred concentration for the reaction of the components in EG is 10 percent by weight of the reactants in EG to 50 percent by weight of the reactants in EG. The ratio of base equivalents to acid equivalents used in making the reaction product from the alkali metal carbonate and acidic phosphorus compound should be in the range of 0.003 to 2.0, with the preferred embodiment being in the range of 0.01 to 0.667.

Before addition of the reaction mixture to polyester production, the mixture can be diluted with EG or water to make a solution. Addition of the reaction product generally takes place after ester exchange, but before the build-up of the polyester to degrees in polycondensation of polymerization of twenty. In the preferred embodiment of this aspect of the invention, the phosphorus modified reaction product is added to polyester production before polycondensation catalyst metals are added to the polyester production sequence.

Useful catalysts for the present invention include various antimony compounds, such as but not limiteds to antimony oxide $Sb_2O_3$. Applicants have further found that the levels of DEG are lowest when Ti compounds are not incorporated as a cocatalyst. Accordingly the present invention is conducted without the addition of a Ti compound.

We have also surprisingly found that adding low levels of a carbonate compound of the present invention produces polyesters having reduced and stable (more controllable) levels of DEG. The carbonate compounds for this embodiment are the same as those disclosed above. Suitable levels of carbonate compound are between about 2 ppm and about 250 ppm. Polyesters so produced have DEG levels which are generally less than about 2 wt % DEG and more preferably less than about 1 wt % DEG. Polyesters produced according to this embodiment also display improved color generally a b* of 5 or less.

In another aspect of this invention, we have discovered a process to make low DEG containing polyesters in which a finely divided clay suspended in EG is added to the reaction mixture. In this invention the clay is first suspended in EG. The clay is treated with an acidic phosphorus compound to neutralize metals found naturally in clay which cause degradation side reactions in the polymerization process of linear polyester, most notably DEG formation. The treated clay is then buffered with an alkali metal carbonate.

Addition of the suspension, thus treated, after ester exchange in a standard polyester production sequence, produces DEG of less than 1.0 weight percent.

Phosphorus compounds that may be used in this embodiment include phosphoric acid, phosphorous acid, acidic salts and acidic esters thereof and mixtures thereof. The quantity of phosphorus used in this process is dictated by the concentration of metals which cause undesirable side reactions in polyester production found in the clay. Metal content in these clays are normally in the range of 0.2 to 0.5 weight percent. The ratio of phosphorus to metals should be in a range of 1.0 to 5.0, preferably 3.0.

Following phosphorus treatment, an alkali metal carbonate is added to the clay suspension. Unlike, the teachings of U.S. Pat. No. 4,960,915, the present invention does not require an elaborate procedure to check the pH of the suspension with a glass electrode and make a number of adjustments in base concentration to be in a pH range of 6.1 to 9.0, where several minutes are required for equilibration to occur between pH adjustments. The ratio of base equivalents from the alkali metal carbonate added to the suspension to the acid equivalents from the acidic phosphorus compound should be in the range of 2.0 to 0.1, preferably between 1.0 and 0.2. A number of alkali metal carbonates can be utilized for this invention, including potassium carbonate, sodium carbonate, lithium carbonate, calcium carbonate, magnesium carbonate, or mixtures thereof. The preferred embodiment of the patent uses sodium or potassium carbonate.

The clay/EG suspension can range from as dilute as 5 weight percent clay in EG to as concentrated as 80 weight percent, preferably in the range of 30 to 60 weight percent clay. The usual range of finely divided clay in the polyester is 0.01 to 10 weight percent. The preferred embodiment of this invention is in the range of 0.5 to 2.0 percent. Generally, the buffered clay/EG suspension is added directly after ester exchange. However, the suspension can be added later in the production sequence as necessary, provided the overall melt viscosity at the time of suspension addition is low enough to allow adequate mixing.

All aspects of this invention can be used either in a continuous process or batch process to make linear polyesters and copolyesters.

The polyester of the present invention is selected from polyethylene terephthalate (PET), polyethylene naphthalenedicarboxylate (PEN) or copolyesters thereof. The acid component of polyester contains repeat units from at least about 75 mole percent and preferably at least about 85 mole percent terephthalic acid, naphthlenedicarboxylic acid or mixtures thereof and at least about 75 mole percent and preferably at least about 85 mole percent ethylene glycol, based on 100 mole percent dicarboxylic acid and 100 mole percent diol.

The dicarboxylic acid component of the polyester may optionally be modified with up to about 15 mole percent, and preferably up to about 10 mole percent of one or more different dicarboxylic acids. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids to be included with terephthalic acid are: phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like. Examples of dicarboxylic acids to be included with naphthalenedicarboxylic acid are: terephthalic acid, phthalic acid, isophthalic acid, other isomers of naphthalenedicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like. Polyesters may be prepared from two or more of the above dicarboxylic acids.

In addition, the glycol component may optionally be modified with up to about 25 mole percent and preferably up to about 15 mole percent, of one or more different diols other than ethylene glycol. Such additional diols include cycloaliphatic diols preferably having 6 to 20 carbon atoms or aliphatic diols preferably having 3 to 20 carbon atoms. Examples of such diols to be included with ethylene glycol are 1,4-cyclohexanedimethanol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)- propane, 2,4-dihydroxy-1,1,3,3-tetramethylcyclobutane, 2,2-bis-(3-hydroxyethoxyphenyl)-propane, and 2,2-bis-(4-hydroxypropoxyphenyl)-propane. Polyesters may be prepared from two or more of the above diols.

The resin may also contain small amounts of trifunctional or tetrafunctional comonomers such as trimellitic anhydride, trimethylolpropane, pyromellitic dianhydride, pentaerythritol, and other polyester forming polyacids or polyols generally known in the art.

The following examples are reported for illustrative purposes, and in no way should these examples be construed as limiting this invention.

EXAMPLES

Example 1

PEN (Control)

One hundred parts of 2,6-dimethylnaphthalate (DMN) was slurried in 52 parts ethylene glycol (EG) and transferred to prepolymer reactor I. The agitator was set at 100 rpm with the contents of the vessel blanketed with nitrogen. A slurry consisting of 0.0325 parts manganese diacetate and 0.212 parts EG was added to prepolymer reactor I with the process temperature at 160° C. The contents of the reactor was then heated from 160° to 220° C. over a 6-hour period. This was followed with a 60 minute hold at 220° C. At the end of this ester exchange period, 97% of theoretical methanol evolution had taken place with the sampled monomer containing 0.26 weight percent diethylene glycol (DEG). Immediately following ester exchange, 0.017 parts of 85% by weight food grade phosphoric acid was added to the contents of prepolymer reactor I, followed ten minutes later by a slurry containing 0.041 part antimony trioxide in 0.212 parts EG. The process temperature was then raised from 220° C. to 265° C. over a 1.5-hour period while simultaneously vacuum was reduced from atmospheric pressure to 30 torr over this same time frame. Pressure is then broken and prepolymer sampled at this point was found to contain 0.57 weight percent DEG. The prepolymer melt was then transferred over approximately 15 minutes from prepolymer reactor I to finishing reactor II at a process temperature of 265° C. Reactor II agitator was initially set at 30 rpm. The process temperature was raised from 265° to 285° C. over 1.5 hours as vacuum was reduced to 0.5 torr. At 285° C. and 1 torr, the agitator was slowed to maintain constant power as polymer melt viscosity increased. At a torque reading equivalent to a polymer inherent viscosity of 0.56 dL/g, as measured in 60/40 parts phenol/tetrachloroethylene at 25° C. and a concentration of 0.25 g/dL, vacuum treatment was discontinued and the melt was extruded from the reactor in rods, cooled in water, and cut into pellets. Polymer yield was 87% of theoretical with final polymer DEG content of 0.83 weight percent.

Example 2

Sodium Carbonate Added at the Beginning

The same procedure described in Example I was used with the exception that 0.0175 parts of sodium carbonate was added to the initial EG/DMN slurry in prepolymer reactor I at 160° C. As in Example I, samples were taken at the monomer and final polymer stages. Weight percent DEG for these samples were respectively, 0.58 and 0.74. As can be seen, only a small insignificant lowering of DEG took place when sodium carbonate was added at this point in the reaction sequence.

Example 3

Pretreatment of Phosphoric Acid with Sodium Carbonate

Example I was again practiced with the following exceptions. A mixture was made in 0.212 parts EG by reacting 0.0175 parts sodium carbonate with 0.0166 parts phosphoric acid (85%, food grade) at approximately 70° C. for one hour. After diluting the mixture with an additional 0.212 parts EG, the mixture was added in place of phosphoric acid (described in Example I) immediately after ester exchange to prepolymer reactor I at 220° C. and atmospheric pressure. Weight percent DEG for the monomer and final polymer were 0.22 and 0.31. It can be seen from this example that treatment of phosphoric acid with sodium carbonate produced a mixture which produced a much lower DEG concentration in the PEN backbone.

Example 4

PEN Containing Clay Additive (Control)

One hundred parts of DMN was slurried in 52 parts EG and transferred to prepolymer reactor I. The agitator was set at 100 rpm with the contents of the vessel blanketed with nitrogen. A slurry consisting of 0.0325 parts manganese diacetate and 0.212 parts EG was added to prepolymer reactor I with the process temperature at 160° C. The contents of the reactor was then heated from 160° to 220° C. over a six-hour period. This was followed with a sixty minute hold at 220° C. At the end of ester exchange, 97% of theoretical methanol had been generated and monomer was sampled before proceeding to the prepolymer step. Following sampling, 0.017 parts of 85% phosphoric acid was charged to the reactor, followed ten minutes later by a slurry containing 0.041 parts antimony trioxide in 0.212 parts EG. After ten more minutes, a clay/EG slurry weighing two parts (approximately 50% clay by weight) was charged to prepolymer reactor I. The process temperature was then raised from 220° to 265° C. over 1.5 hours while vacuum was reduced from atmospheric pressure to 50 torr over the same period. Upon reaching 265° C., vacuum was broken off, prepolymer was sampled, and the contents of prepolymer reactor I was transferred to finishing reactor II in approximately 15 minutes. With reactor II at 265° C. and agitator set at 30 rpm, the process temperature was raised to 285° C. over 1.5 hours as vacuum was reduced to one torr. At 285° C. and one torr, the agitator was slowed to maintain constant power as polymer melt viscosity increased. At a torque reading equivalent to a polymer inherent viscosity of 0.56 dL/g, as measured in 60/40 parts phenol/tetrachloroethane at 25° C. and a concentration of 0.25 g/dL, vacuum treatment was discontinued and the melt was extruded from the reactor in rods, which were cooled in water, and cut into pellets. Polymer yield was 85% of theoretical. DEG concentrations for monomer and final polymer were, respectively, 0.26 and 1.59.

Example 5

PEN Buffered Clay Additive

Following Example IV, with the exception that the clay/EG slurry was treated with 0.02 parts phosphoric acid (85% by weight), which was mixed for 30 minutes prior to addition of 0.025 parts sodium carbonate. Mixing was continued for an additional hour. This buffered clay slurry was added as per the addition of the clay/EG slurry described in example IV. DEG was 0.32 and 0.57, respectively for monomer and final polymer samples. Buffering the clay EG slurry resulted in a significant decrease in DEG of the final polymer when compared to Example IV control.

Example 6

PEN Buffered Clay Additive Variation

Following Example V, with the exception that instead of addition of phosphoric acid immediately after ester exchange, a mixture made by reaction of 0.0166 parts phosphoric acid (85 wt. %) with 0.0175 parts sodium carbonate slurried in 0.212 parts EG, was added to prepolymer reactor I at 220° C. DEG content was 0.37% for the monomer and 0.60 wt % for the final polymer, comparable to Example V of this invention.

Examples 7–17

PET with and without buffer

PET was prepared using two different phosphorus sources: $H_3PO_4$ buffered with sodium cabonate and unbuffered $H_3PO_4$. About 1942 gm (10 moles) dimethyl terephthalate, about 1214 gms ethylene glycol (20 moles) and 55 ppm Mn catalyst were charged to a batch reaction vessel. The flask was equipped with an overhead stirred, thermocouple and a column packed with glass beads and was connected to a water jeackated takeoff condenser. The reaction mixture was heated to a maximum of 240° C. with stirring and the temperature maintained at about 240° C. until methanol generation ceased. At this point the phosphorus compound was added (55 ppm P target) followed by 200 ppm Sb as $Sb_2O_3$. A 125 portion of monomer was transferred into a 500 ml round bottom flask equibbed with a nitrogen inlet, stirrer, vacuum outlet and consensing flask. The flask was immersed into a Belmont metal bath preheated to 225° C. The temperature was increaded to 292° C. over a 65 minute period with a slow stream of nitrogen bleeding into the system. After stopping the nitrogen flow, a vacuum was applied and the polycondensation completed by heating at 292° C. and 0.5 torr. for 60 minutes. At the completion of the reaction, the flask was removed from the metal bath and allowed to cool in a nitrogen atmosphere. After grinding in a Wiley Mill to a particle size of about 3 mm the inherent viscosity, DEG and concentrations of Mn, Sb and P were determined. Six replicate runs were conducted for the buffered phosphorus source and five replicate runs were conducted for the unbuffered phosphorus.

The buffered phosphoric acid was prepared by mixing 85 g $H_3PO_4$ (85%) and 15 g $Na_2CO_3$ and diluting with 185 g ethylene glycol (0.2 mole $Na_2CO_3$/mole $H_3PO_4$). The PET was anaylzed for IV, DEG, and concentration of Mn, Sb and P. The results are listed in Table 1, below.

TABLE 1

| Ex # Phosphorus Source | Buffer | IV (dL/g) | DEG (wt %) | Mn (ppm) | Sb (ppm) | P (ppm) |
| --- | --- | --- | --- | --- | --- | --- |
| 7 | Y | 0.546 | 1.36 | 54.9 | 196 | 51 |
| 8 | Y | 0.459 | 1.34 | 54.1 | 198 | 51 |
| 9 | Y | 0.524 | 1.33 | 52.9 | 198 | 53 |
| 10 | Y | 0.453 | 1.37 | 51.6 | 195 | 52 |
| 11 | Y | 0.523 | 1.4 | 54.2 | 190 | 50 |
| 12 | Y | 0.482 | 1.34 | 52 | 191 | 50 |
| 13 | N | 0.533 | 1.67 | 57 | 196 | 54 |

TABLE 1-continued

| Ex # Phosphorus Source | Buffer | IV (dL/g) | DEG (wt %) | Mn (ppm) | Sb (ppm) | P (ppm) |
| --- | --- | --- | --- | --- | --- | --- |
| 14 | N | 0.522 | 1.72 | 57.2 | 212 | 52 |
| 15 | N | 0.546 | 1.64 | 55.2 | 208 | 52 |
| 16 | N | 0.474 | 1.71 | 55.2 | 207 | 54 |
| 17 | N | 0.505 | 1.73 | 57.9 | 202 | 51 |

We claim:

1. A process for producing a high molecular weight polyester having less than about 0.5 weight % diethylene glycol comprising adding at least one carbonate compound to the ester exchange reaction product produced from reaction of a glycol component comprising ethylene glycol and an ester component comprising dimethylterephthalate, dimethylnaphthalenedicarboxylate and mixtures thereof wherein said reaction product is formed without a Ti catalyst.

2. The process according to claim 1 wherein said carbonate compound is formed by reaction of an acidic phosphorus compound with an alkali metal carbonate in ethylene glycol.

3. The process of claim 2 wherein said carbonate compound is slurried or dissolved in additional EG or water and added to monomer produced during ester exchange portion prior to addition of polyester catalysts and commencement of polycondensation.

4. The process of claim 2 wherein said alkali metal carbonate is selected from the group consisting of sodium carbonate, potassium carbonate, lithium carbonate, calcium carbonate, magnesium carbonate, or mixtures thereof.

5. The process of claim 4 wherein said alkali metal carbonate is selected from the group consisting of sodium carbonate, potassium carbonate or mixtures thereof.

6. The process of claim 2 wherein said acidic phosphorus compound is selected from the group consisting of phosphoric acid, phosphorus acid, acidic salts and acidic esters, phosphonic acid derivatives and mixtures thereof.

7. The process of claim 6 wherein said acidic phosphorus compound comprises phosphoric acid.

8. The process of claim 2 wherein said reaction is conducted at temperatures below about 80° C. and preferably at temperatures between about room temperature and about 80° C.

9. The process of claim 2 wherein said alkali metal carbonate and said acidic phosphorus compound are present in said ethylene glycol in a concentration from about 10 percent by weight to about 50 percent by weight.

10. The process of claim 2 wherein ratio of base equivalents from the alkali metal carbonate and acid equivalents from the acidic phosphorus compound is between about 0.003 and about 2.0.

11. The process of claim 10 wherein said ratio is between about 0.01 and about 0.667.

12. The process of claim 1 wherein low levels of a carbonate compound are added to produce polyesters having reduced and controllable levels of DEG.

13. The process of claim 12 wherein said polyester has a b* of less than about 5.

14. A process for making polyesters via esterification containing levels of diethylene glycol less than about 1 weight % comprising the steps of suspending finely divided clay in ethylene glycol and adding said clay/ethylene glycol suspension to the esterification step.

15. The process of claim 14 wherein said clay is treated with an acidic phosphorus compound to neutralize metals in said clay which cause degradation side reactions during polymerization.

16. The process of claim 15 further comprising the step of buffering said clay with an alkali metal carbonate.

17. The process of claim 15 wherein said acidic phosphorus compound is selected from the group consisting of phosphoric acid, phosphorus acid, acidic salts and acidic esters thereof and mixtures thereof.

18. The process of claim 15 wherein said acidic phosphorus compound is added in a ratio to said metals in a range of about 1.0 to about 5.0.

19. The process of claim 18 wherein said ratio is about 3.0.

20. The process of claim 14 further comprising the step of adding an alkali metal carbonate is added to the clay suspension.

21. The process of claim 20 wherein ratio of base equivalents from said alkali metal carbonate to acid equivalents from said acidic phosphorus compound are between about 2.0 to about 0.1.

22. The process of claim 21 wherein said ratio is between about 1.0 and about 0.2.

23. The process of claim 20 wherein said alkali metal carbonate is selected from the group consisting of potassium carbonate, sodium carbonate, lithium carbonate, calcium carbonate, magnesium carbonate, or mixtures thereof.

24. The process of claim 23 wherein said alkali metal carbonate comprises sodium carbonate or potassium carbonate.

25. The process of claim 14 wherein said clay/EG suspension has a concentration from about 5 weight percent clay in EG to about 80 weight percent.

26. The process of claim 25 wherein said concentration is from about 30 to about 60 weight percent clay.

27. The process of claim 14 wherein said clay is present in said polyester in an amount between about 0.01 and about 10 weight percent.

28. The process of claim 14 wherein said clay is present in said polyester in an amount between about 0.5 to about 2.0 percent.

* * * * *